United States Patent [19]

Larson

[11] 3,717,485
[45] Feb. 20, 1973

[54] PATTERN WAX COMPOSITIONS
[75] Inventor: Allen E. Larson, St. Louis, Mo.
[73] Assignee: Atlantic Richfield Company, New York, N.Y.
[22] Filed: March 25, 1971
[21] Appl. No.: 128,142

[52] U.S. Cl. ............106/38.8, 106/38.25, 106/230, 106/270, 106/272, 260/28, 260/28.5 R
[51] Int. Cl. ..............................................C08h 9/06
[58] Field of Search..........106/38.25, 38.8, 270, 272, 106/38.3, 230; 260/28, 28.5 A, 28.5 R; 164/45

[56] References Cited

UNITED STATES PATENTS

| | | | |
|---|---|---|---|
| 2,795,505 | 6/1957 | Finck et al | 106/38.6 |
| 3,263,286 | 8/1966 | Watts et al | 106/38.8 X |
| 3,316,105 | 4/1967 | Feagin | 106/38.8 |

*Primary Examiner*—Lorenzo B. Hayes
*Attorney*—Thomas J. Clough, Frank J. Uxa and Blutcher S. Tharp

[57] ABSTRACT

Novel pattern wax compositions for use in investment casting by the Lost Wax Process are disclosed. The pattern wax composition materials contain base waxes such as petroleum waxes, natural vegetable or mineral waxes, synthetic waxes and various resinous materials derived from the refining of petroleum and wood rosin, and mixtures of the above and solid filler particles. The base wax generally has a melting point of between about 120° to 180° F. The solid filler particles are imides of aromatic polycarboxylic acids.

15 Claims, No Drawings

PATTERN WAX COMPOSITIONS

This invention relates to pattern wax compositions having a base wax and solid filler which have low-shrinkage upon cooling from the temperature of injection to ambient temperature during the making of wax patterns for the Lost Wax Process of investment casting. More specifically, this invention relates to improvements in low-shrinkage, low spalling tendency pattern wax composition and advantages accruing to the Lost Wax Process through the use of such novel pattern wax composition.

Investment casting by the Lost Wax Process involves the making of a destructible wax pattern, commonly by injection molding the pattern in a master mold. The patterns then are dipped into a slurry of a suitable finely-divided refractory mold material which sets up to form a solid shell around the wax pattern. Generally, the pattern is dipped into an aqueous slurry of finely-divided (e.g., less than 325 mesh) silica flour, for instance, or a mixture of finely-divided silica and zircon and then dried. This dipping is repeated until a fine surface is established. The silica-coated pattern is then dipped into an aqueous slurry of a larger particle size inorganic material, e.g., metal oxides such as alumina, of a particle size of about +100 mesh or larger to build up the refractory mold thickness. This dipping into the larger particle size slurry is repeated until the desired thickness is attained. The dipping slurry can be acidic or basic, for example, with a pH of up to about 9 being preferred. The pattern is subsequently removed from within the refractory mold, usually by heating and melting out the wax and burning any residue remaining inside the mold. Molten metal, such as an alloy, can then be poured into the refractory mold, thereby casting the desired metal shapes. Further details of the above process are well known to those skilled in the art.

One of the important requirements of pattern wax materials for high precision application is that they exhibit low-shrinkage as the patterns cool from the respective injection temperatures, at which the waxes are liquid or semi-solid, to the ambient temperature at which the patterns are usually employed to make the refractory molds. Due to the low-shrinkage characteristics, the dimensions of the refractory molds more closely correspond to those of the final metal castings. In this respect, it is common practice to use finely-divided solid filler materials as components of the pattern wax materials in order to reduce the shrinkage of the resultant wax patterns. The filler particles are uniformly distributed throughout the wax, both in the wax-melted state before injection, and in the solid state after injection molding the patterns. However, problems encountered through the use of various filler materials give rise to the need for improved pattern wax compositions.

A particular problem associated with the use of high pH slurries is the possible interaction of components in the pattern wax composition with such slurry. The interaction of a filler material with the slurry which forms the refractory mold can cause spalling on the inside surface of the refractory mold which thereafter will cause imperfections on the metal casting. Thus, it is highly desirable to utilize a filler material which can be used in contact with slurries which have a varying pH, especially when such pH is greater than 9.

An additional problem associated with the use of pattern wax compositions is contact with water during handling and processing, e.g., rinsing the patterns is an aqueous solution to dissipate static change prior to dipping into the slurry. Thus, the solid filler material should be substantially insoluble in water to avoid leaching out the filler material.

Further properties which are highly desirable in a filler material are the ability to be removed from refractory molds during dewaxing or burn out without leaving residues in the refractory molds and the ability to be subjected to prolonged pre-injection conditioning at elevated temperatures prior to actual use without having such filler material form an agglomerate or gel in the pre-injection conditioning equipment. The incomplete removal of the pattern wax compositions and formation of a residue during removal can result in imperfections in the metal casting.

Nitrogen-containing fillers such as the ethylene stearamide, ethylene dilauramide, etc., described in U.S. Pat. No. 3,316,105 are somewhat compatible with the base wax compositions at the initial mixing and pre-injection conditioning temperatures of the filled wax compositions. Because of this compatibility during mixing, or while being maintained at the temperature required to keep the wax fluid or semi-solid prior to injection into the master molds, the filler partially dissolves in the base wax, thus diminishing its desired function of decreasing shrinkage and making it difficult or impossible to keep the wax consistent in composition and properties.

Various attempts have been made to improve the characteristics of pattern waxes. Inorganic fillers such as powdered mica or silica have been employed but these materials are often left in the mold in small amounts subsequent to melting out of the wax pattern material. Some fillers are usually available as irregularly shaped particles, such as wood fiber, sugar or silica, but these are disadvantageous since they can inhibit the flow of the pattern wax into the master mold or out of the refractory molds. Polystyrene beads have also been used for some time as a filler but this material has disadvantages. For instance, during removal from the refractory mold, the pattern wax base can melt first and run out of the mold leaving a polystyrene residue. If heating rates are not properly controlled, the polystyrene will char, making it difficult to remove from the mold. Moreover, even if the polystyrene is melted properly, its viscosity or tacky consistency often causes it to pull away some of the refractory composition from the wall of the mold, thus introducing imperfections on the surface of the metal casting.

An object of this invention is to provide improved pattern wax compositions which have low-shrinkage upon cooling from the molten or semi-solid state at the injection temperature to the solid state at ambient temperature, and a reduced tendency to agglomerate during long hold times at pre-injection temperatures.

A further object of this invention is to provide improved pattern wax compositions which will result in a reduced incidence of spalling on the inside surfaces of the refractory molds.

It has now been found that pattern wax compositions having low-shrinkage characteristics and a reduced incidence of spalling in the refractory molds are obtained by pattern wax compositions consisting essentially of about 25 to 95 parts by weight of a base wax and about 5 to 75 parts by weight of a filler material selected from the group consisting of

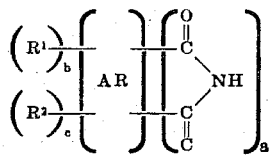

wherein

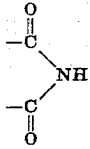

is attached to adjacent carbon atoms on AR, AR is selected from a benzene nucleus and a biphenyl nucleus, $R^1$ is carboxy, $R_2$ is selected from carboxy, methoxycarbonyl and ethoxycarbonyl and, when $R^1$ and $R^2$ are attached to adjacent carbon atoms on AR, $R^1$ and $R^2$ can together form

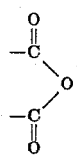

$a$ is an integer having a value of from 1 to 2; $b$ is an integer having a value of from 0 to 4; and $c$ is an integer having a value of from 0 to 2 provided that the sum of $a$, $b$ and $c$ does not provide a number of substituents in excess of that required to satisfy the valences of the carbon atoms in AR.

It is preferred that AR is benzene and that $R^2$ is carboxy, or together with $R^1$ forms

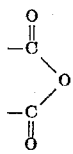

It is still further preferred that $b$ have a value of from 0 to 2 and that $c$ have a value of 0 to 1. The particularly preferred species are those within the above formula wherein $a$ has a value of from 1 to 2 and $b$ and $c$ have a value of 0.

Typical examples of imide compounds within the above formula are phthalimide, 4,5-dicarboxyphthalimide, 4-carboxy phthalimide, 3,4-biphenyldicarboximide, 4-methoxycarbonyl phthalimide and the di-imide of pyromellitic anhydride.

The parts by weight as set forth above refer to parts by weight of the total pattern wax composition. The finely divided filler material often has particle sizes up to 600 microns, preferably from about 50 to about 250 microns, in their maximum dimension. Particle sizes in the preferred range generally have smooth surfaces and desirable flow characteristics. Generally, the smaller the particles, the less likely they are to settle out at elevated temperatures at which the filler is in the solid state and the other components of the compositions are liquid.

The pattern wax compositions preferably contain a major amount of the base wax and a minor amount, e.g. less than 50 parts by weight, of the filler. Suitable base wax compositions can include petroleum waxes, natural vegetable or mineral waxes, such as Carnauba wax, synthetic waxes and various thermoplastic resinous materials derived, for example, from tall oil, gum and wood rosin, terpene-type resins or mixtures of these materials and synthetic polymers and copolymers, such as polyethylene or ethylene vinyl acetate and mixtures and combinations of the above. The base wax compositions usually melt at temperatures in the range of about 120° F. to about 180° F. Suitable base wax blends include petroleum waxes including paraffin waxes which have a melting point from about 135° F. to about 160° F. and microcrystalline waxes having a melting point from about 130° F. to about 180° F. These waxes may be fully refined and thus contain very small amounts of hydrocarbon oils. Particularly preferred base wax blends comprise from about 5 to about 40 parts by weight of a paraffin wax, more preferably from about 7 to about 30, from about 5 to about 40 parts by weight of a microcrystalline wax, more preferably from about 7 to about 30, from about 5 to about 50 parts by weight of a dimerized resin acid from wood rosin, more preferably from about 7 to about 35, and from about 1 to about 40 parts by weight of a resinous component, more preferably from about 3 to about 35, having a softening point within the range of from about 125° to 350° F. selected from the group consisting of a vinyl toluene α-methyl styrene interpolymer resin, a terpene resin, an ethylene vinyl acetate copolymer and mixtures thereof.

The dimerized resin from wood rosin in general has a softening point within the range of from about 125° F. to about 350° F., more preferably from about 275° F. to about 305° F. The dimerized resin from wood rosin can be obtained by the solvent extraction of aged pine wood to produce a refined wood rosin. The refined wood rosin in general has substantial amounts of terpene oils such as turpentine and pine oil which is present in the pine wood removed by the solvent extraction method. The refined wood rosin is then subjected to a polymerization process to produce a dimerized resin from wood rosin within the above softening point ranges and in general has a softening point of about 290° F. In general, typical dimerized resin from wood rosin have properties as follows:

| | |
|---|---|
| Acid No. 140 | Density 20° C. gm./ml. 1.069 |
| Color USDA Rosin Scale | Flash Point 487° F. |
| Saponification No. 145 | Molecular Weight 502 |
| Unsaponifiables 8 | Ash Content 0.003 Wt. % |
| Bromine No. 93 | |

The resinous component is selected from a vinyl toluene α-methyl styrene interpolymer resin, a terpene resin and an ethylene vinyl acetate copolymer and mixtures thereof. The ethylene vinyl acetate copolymer in general has a polymerized vinyl acetate content ranging from about 15 to about 40 weight percent, more preferably from about 20 to about 35 weight percent and a melt index of from about 0.1 to about 450 (ASTM D–1238-62), more preferably a melt index ranging from about 1 to about 150. The preferred ethylene vinyl acetate copolymers are those having a polymerized vinyl acetate content ranging from about 18 weight percent to about 28 weight percent and a melt index ranging from about 1 to about 150.

The resinous component can, in addition, be a terpene resin which can be either natural or synthetic. The terpene resins in general are characterized by softening points of at least 140° F. These polyterpenes are, in general, substantially polymerized α or β pinenes and have Ring and Ball softening points ranging from 100° F. to about 300° F., more preferably a softening point from about 160° F. to about 260° F. The preparation of typical terpene resins are described in U.S. Pat. No. 3,297,673 which is incorporated herein by reference.

An additional resinous component which can be utilized for preparing the pattern wax compositions is a vinyl toluene α-methyl styrene interpolymer resin which, in general, has a melting point of from about 150° F. to about 240° F.

The above resinous components can be utilized as a mixture when compounded into the pattern wax compositions. The ratio of the resinous components within such mixture can vary over a wide range although it is preferred to use each resinous component singly in combination with the other components of the pattern wax composition.

Various other materials can be incorporated into the pattern wax composition in order to produce a particularly desirable property. Thus, for example, an anti-oxidant may be incorporated into the compositions if an anti-oxidant under the particular process conditions is required. In addition, a filler material can be added to the composition in amounts ranging from 0 up to 50 parts by weight of filler material based upon the total weight of the pattern wax composition. Typical examples of such filler materials are ortho, iso and terephthalic acid, and the like. The finely-divided filler material often has particle sizes up to 600 microns, preferably up to about 250 microns, in their maximum dimension.

In addition, various thermoplastic materials, for example, natural vegetable or mineral waxes, synthetic waxes, (e.g.) polyethylene, and tall oil resins, can be incorporated into the compositions as additional components. A preferred vegetable wax which can be utilized is Carnauba. In general, it is preferred to incorporate a vegetable wax into the compositions at a concentration of from 0 to about 40 parts by weight, more preferably from about 5 to about 35 parts by weight based upon the total composition.

The invention can be better appreciated by the following non-limiting examples.

In the following examples the melting point of the paraffin wax was determined according to ASTM D–87 and for the microcrystalline wax according to ASTM D–127.

EXAMPLE I

A suitable base wax composition contains 20 parts by weight of a paraffin wax, having a melting point of about 143° F., 20 parts by weight microcrystalline wax having a melting point of about 140° F., 20 parts by weight Carnauba wax, having a melting point of about 181° to 190° F., such as Pure Refined No. 3 N.C. Carnauba having a softening point of 185° F., and 40 parts by weight terpene phenolic resin having a softening point of about 212° F., a specific gravity of 1.02, a color (gardner) of 7, an acid number nil, and a methylol content of none. A filled pattern composition is made using 80 parts by weight of this base wax and 20 parts by weight phthalimide which had been passed through a U.S. Standard 200 mesh screen. The composition is stable at wax temperatures and leaves essentially no residue after burning.

In the following examples II through V, a base wax is prepared using various components on a part-by-weight basis. The total parts-by-weight for the base wax blend provide 100 parts. The pattern wax compositions of this invention are prepared by blending varying parts-by-weight of the total base wax blend with a filler.

| Base Wax Blend Component | Examples Parts-by-Weight | | | |
|---|---|---|---|---|
| | II | III | IV | V |
| Paraffin Wax, 133° F. melting point | -- | -- | 24 | 10 |
| Paraffin Wax, 143°F. melting point | -- | 25 | -- | 10 |
| Paraffin Wax, 153°F. melting point | 30 | -- | -- | 10 |
| Microcrystalline Wax, 140°F. melting point | -- | 25 | -- | -- |
| Microcrystalline Wax, 170°F. melting point | 30 | -- | 8 | 10 |
| Carnauba Wax, 185°F. melting point | 15 | 25 | 8 | 10 |
| Dimerized Resin Acid from Wood Rosin, 290° F. softening point | -- | -- | 20 | 25 |
| Copolymer of vinyl toluene and α-methyl styrene, 150°F. softening point | -- | -- | 20 | -- |
| Terpene resin having a specific gravity of 0.97, a melting point of 115° F., a bromine number of 5, a saponification number of less than 1, and a refractive index of 1.53 | 25 | 25 | -- | 25 |
| Pattern Wax Composition | | | | |
| Base Wax Blend | 80 | 70 | 80 | 60 |
| Filler - Phthalimide | 20 | 30 | -- | -- |
| Di-imide of Pyromellitic Anhydride | -- | -- | 20 | 40 |

The compositions of this invention provide pattern waxes which have a reduced rate of shrinkage after injection thereby providing for precision casting substantially corresponding to the original master mold. In addition, the compositions of this invention are substantially removed after burning from the refractory mold thereby leaving substantially no residue which would provide imperfections in the final casting.

The compositions of this invention are particularly adaptable to an improved process for forming a mold of desired shape in which a pattern material is shaped in a mold of the desired shape by a process in which a molded pattern material is coated with a slurry of finely divided refractory material, the coating is dried, the coatings and drying being repeated to build up a total refractory coating of a desired thickness and the pattern material removed by melting from within the coating to form a refractory mold.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A composition consisting essentially of from about 25 to about 95 parts by weight of said composition of a base wax melting in the range of about 120°–180° F., and about 5 to about 75 parts by weight of said composition of a filler selected from the group consisting of

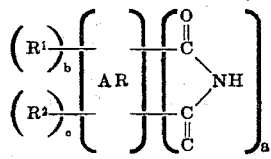

wherein

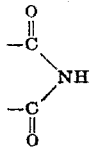

is attached to adjacent carbon atoms on AR, AR is selected from a benzene nucleus and a biphenyl nucleus, $R^1$ is carboxy, $R_2$ is selected from carboxy, methoxycarbonyl and ethoxycarbonyl and, when $R^1$ and $R^2$ are attached to adjacent carbon atoms on AR, $R^1$ and $R^2$ can together form

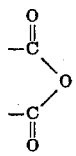

$a$ is an integer having a value of from 1 to 2; $b$ is an integer having a value of from 0 to 4; and $c$ is an integer having a value of from 0 to 2 provided that the sum of $a$, $b$ and $c$ does not provide a number of substituents in excess of that required to satisfy the valences of the carbon atoms in AR.

2. A composition of claim 1 wherein AR is benzene, $R^2$ is selected from carboxy and

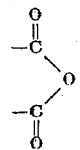

which is formed together with $R^1$, $b$ has a value of from 0 to 2 and $c$ has a value of from 0 to 1.

3. A composition of claim 2 wherein $b$ and $c$ have a value of 0, $a$ has a value of 1 to 2 and the base wax comprises a petroleum wax.

4. A composition of claim 3 wherein the filler is phthalimide.

5. A composition of claim 3 wherein the base wax comprises from about 5 to about 40 parts by weight paraffin wax, from about 5 to about 40 parts by weight of a microcrystalline wax and from about 0 to about 40 parts by weight of a vegetable wax.

6. A composition of claim 5 wherein the base wax contains an additional component of from 1 to about 50 parts by weight of one or more resinous components having a softening point within the range of from about 125° F. to about 350° F.

7. A composition of claim 6 wherein the resinous component material is selected from the group consisting of a vinyl toluene α-methyl styrene interpolymer resin, a terpene resin, a dimerized resin acid from wood rosin and mixtures thereof.

8. A composition of claim 7 wherein the resinous component material is selected from the group consisting of a vinyl toluene α-methyl styrene interpolymer resin, a terpene resin, a dimerized resin acid from wood rosin and mixtures thereof and the filler is phthalimide.

9. A composition of claim 8 wherein the resinous component is a mixture of vinyl toluene α-methyl styrene interpolymer resin and dimerized resin acid from wood rosin.

10. A composition of claim 8 wherein the resinous component is a mixture of dimerized resin acid from wood rosin and a terpene resin.

11. In a process for forming a mold of desired shape in which a pattern material is shaped in a mold of the desired shape, the molded pattern material is coated with a slurry of finely-divided refractory material, the coating is dried, the coatings and drying being repeated to build up a total refractory coating of a desired thickness and the pattern material removed by melting from within the coating to form a refractory mold, the improvement which comprises using as said pattern material a composition of claim 1.

12. In a process for forming a mold of desired shape in which a pattern material is shaped in a mold of the desired shape, the molded pattern material is coated with a slurry of finely divided refractory material, the coating is dried, the coatings and drying being repeated to build up a total refractory coating of a desired thickness and the pattern material removed by melting from within the coating to form a refractory mold, the improvement which comprises using as said pattern material a composition of claim 3.

13. In a process for forming a mold of desired shape in which a pattern material is shaped in a mold of the desired shape, the molded pattern material is coated with a slurry of finely divided refractory material, the coating is dried, the coatings and drying being repeated to build up a total refractory coating of a desired thickness and the pattern material removed by melting from within the coating to form a refractory mold, the improvement which comprises using as said pattern material a composition of claim 4.

14. In a process for forming a mold of desired shape in which a pattern material is shaped in a mold of the desired shape, the molded pattern material is coated with a slurry of finely divided refractory material, the coating is dried, the coatings and drying being repeated to build up a total refractory coating of a desired thickness and the pattern material removed by melting from within the coating to form a refractory mold, the improvement which comprises using as said pattern material a composition of claim 8.

15. In a process for forming a mold of desired shape in which a pattern material is shaped in a mold of the desired shape, the molded pattern material is coated with a slurry of finely divided refractory material, the coating is dried, the coatings and drying being repeated to build up a total refractory coating of a desired thickness and the pattern material removed by melting from within the coating to form a refractory mold, the improvement which comprises using as said pattern material a composition of claim 10.

* * * * *